(12) United States Patent
Jeong

(10) Patent No.: US 7,070,223 B2
(45) Date of Patent: Jul. 4, 2006

(54) DETACHABLE SEAT FOR VEHICLES

(75) Inventor: Chan Ho Jeong, Gwangmyeong (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/946,027

(22) Filed: Sep. 21, 2004

(65) Prior Publication Data

US 2005/0067852 A1    Mar. 31, 2005

(30) Foreign Application Priority Data

Sep. 30, 2003    (KR)    ........................ 10-2003-0067748

(51) Int. Cl.
*B60N 2/02*    (2006.01)

(52) U.S. Cl. .................. 296/65.03; 296/63; 296/65.01; 297/452.38; 297/217.2

(58) Field of Classification Search ............. 296/65.03, 296/65.01, 63; 297/452.38, 217.2, 336; 248/503.1
See application file for complete search history.

(56) References Cited

U.S. PATENT DOCUMENTS

| | | | | |
|---|---|---|---|---|
| 5,007,682 A | * | 4/1991 | Kuwabara et al. | ..... 297/452.38 |
| 5,716,100 A | * | 2/1998 | Lang | ...................... 297/378.12 |
| 5,762,401 A | * | 6/1998 | Bernard | .................. 297/378.13 |
| 5,855,414 A | * | 1/1999 | Daniel et al. | .......... 297/378.13 |
| 6,045,190 A | * | 4/2000 | Ward et al. | .............. 297/378.1 |
| 6,149,241 A | * | 11/2000 | Waku et al. | ............. 297/463.2 |
| 6,161,890 A | * | 12/2000 | Pesta et al. | ............... 296/65.01 |
| 6,354,663 B1 | * | 3/2002 | Zhang et al. | ................ 297/336 |
| 6,585,321 B1 | * | 7/2003 | Taguchi et al. | .......... 297/344.1 |

FOREIGN PATENT DOCUMENTS

| | | |
|---|---|---|
| JP | 2000-145234 | 5/2000 |
| JP | 2002-000032 | 1/2002 |

* cited by examiner

*Primary Examiner*—D. Glenn Dayoan
*Assistant Examiner*—Greg Blankenship
(74) *Attorney, Agent, or Firm*—Morgan Lewis & Bockius LLP

(57) ABSTRACT

A detachable seat for a vehicle, provided for visualizing whether the seat is locked on the floor panel through an indicator window. The detachable seat is composed of such components as a bracket consisting of a locking section the can be selectively locked to a striker provided on the floor panel of a vehicle, a lock cam and lock plate and a body section supporting the locking section, the indicator window with a specified area formed by a penetration in covers on the seat, and a highly recognizable colored paint applied on the interlocking section so that it is possible to check through the indicator window from outside whether the seat is locked when the striker is locked at the locking section.

3 Claims, 3 Drawing Sheets

DETACHABLE SEAT FOR VEHICLES

CROSS-REFERENCE TO RELATED APPLICATIONS

This application claims priority of Korean Application No. 10-2003-0067748, filed Sep. 30, 2003, the disclosure of which is incorporated herein by reference.

BACKGROUND OF THE INVENTION (a) Field of the Invention

The present invention relates to a detachable seat, and more particularly to a device that can improve user convenience and safety as a device to visualize whether the seat is locked on the floor panel through an indicator window provided on the seat.

(b) Description of the Related Art

Generally, vehicles are classified into various types such as passenger cars, freight cars and special purpose vehicles. Passenger cars have seats fixed to the floor panel so that passengers can sit on them.

In order to expand the functionality of the vehicles recently used for various purposes such as RV, fixed seats can be replaced with detachable seats so that when transporting people, the seat is mounted to accommodate more passengers and when transporting goods, the detachable seat is separated from the car body to accommodate more cargo in this expanded space within the car.

However, in the case of the typical detachable seat of a conventional vehicle, it is difficult for a user to determine visually whether the locking section of the bracket that secures the seat is correctly locked. If an accident takes place when the detachable seat is not correctly locked to the car body, the detachable seat can be overturned causing the possibility of injury to the passenger to increase significantly.

SUMMARY OF THE INVENTION

Embodiments of the present invention provide a detachable seat for a vehicle which improves user convenience and safety by allowing the user to clearly recognize whether the seat is locked to the floor panel through an indicator window. Embodiments of the present invention thus include a locking section equipped with lock cam and lock plate which can be selectively locked to a striker provided on the floor panel of a vehicle. An indicator window with a specified area is formed on the covers on the seat, which includes the covers provided on both sides of the said bracket. Preferably, highly recognizable colored paint is applied on the locking section so that it is possible to check through the indicator window from outside whether the seat is locked when the striker is locked at the locking section.

DETAILED DESCRIPTION OF THE PREFERRED EMBODIMENTS

Figure 1:
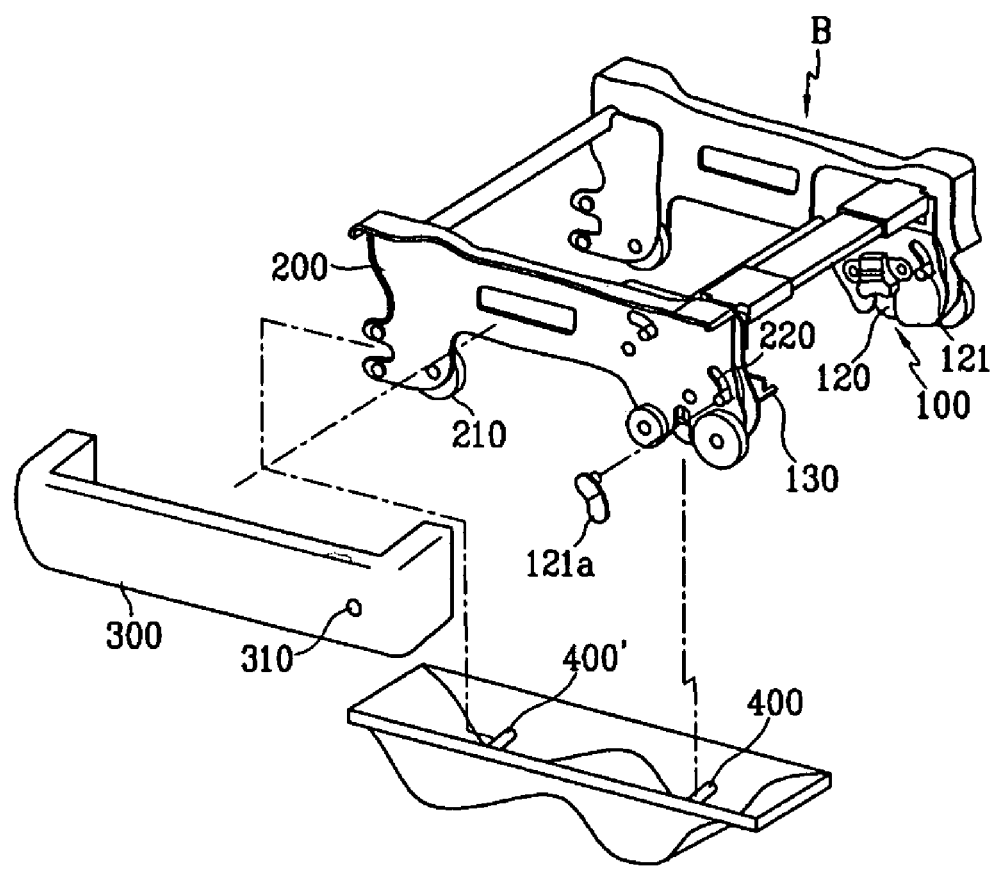
FIG. 1 is a perspective view of an embodiment of a detachable seat for a vehicle of the present invention.

As shown in FIGS. 1 to 5, a detachable seat for a vehicle of the present invention is comprised of such components as the bracket (B) including locking section 100 that can be selectively locked to the striker 400 provided on the floor panel of a vehicle. The locking system is equipped with lock cam 110 and lock plate 120. Body section 200 supports the locking section 100. Indicator window 310 is formed on covers 300. The seat includes the covers 300 on both sides of bracket (B). (Only one side cover is shown in the figure). A distinct color such as a highly visible colored paint or other coating is applied on the interlocking section so that it is possible to check through the indicator window 310 whether the seat is locked when the striker 400 is locked at the locking section 100.

Figure 2:
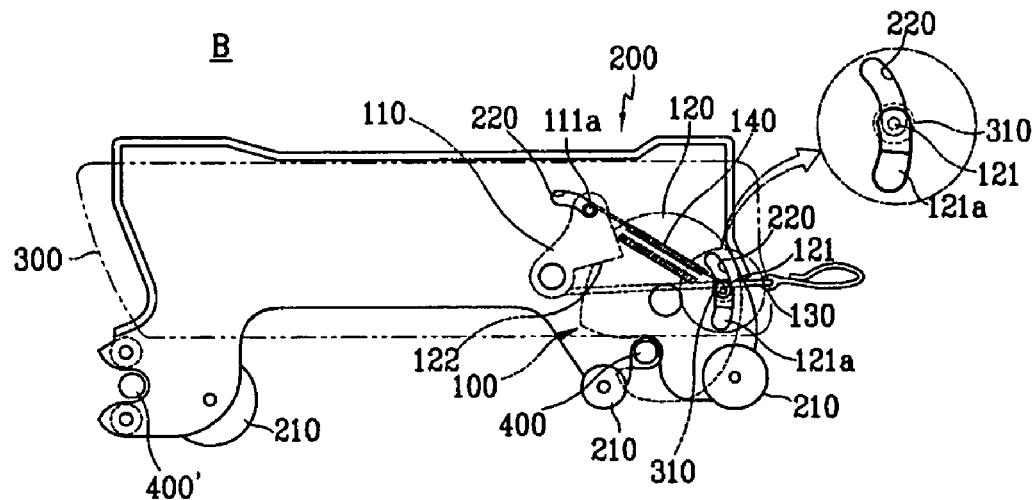
FIGS. 2 and 3 are side views illustrating the operation of a detachable seat for a vehicle according to an embodiment of the present invention.
Figure 3:
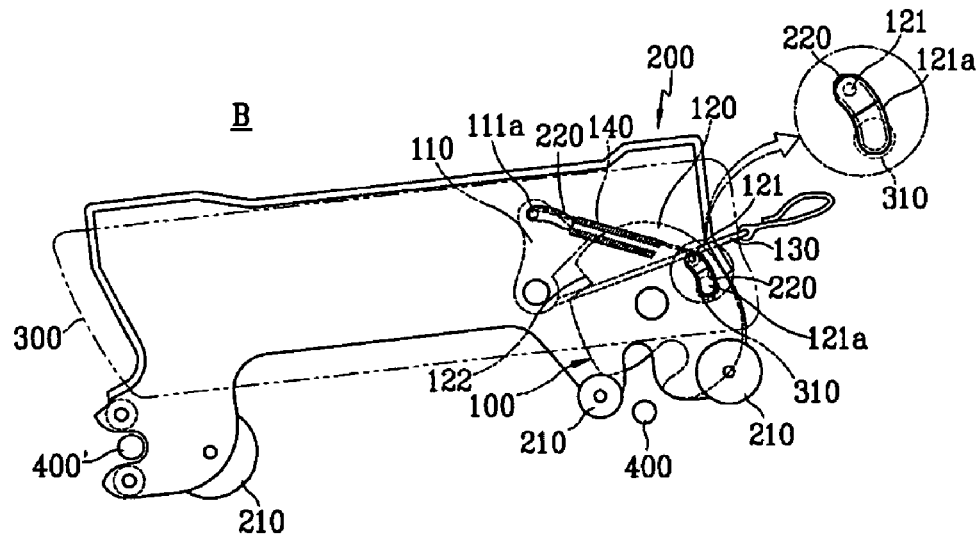

Referring to FIGS. 1 to 3, a first embodiment of the detachable seat for a vehicle of the present invention is described in more detail. Indicator panel 121a, applied with the highly visible paint, is fastened to the lock plate pin 121 guiding the rotation of the lock plate 120. The indicator window 310 can be formed on the rotation section of the said indicator panel 121a.

Figure 4:
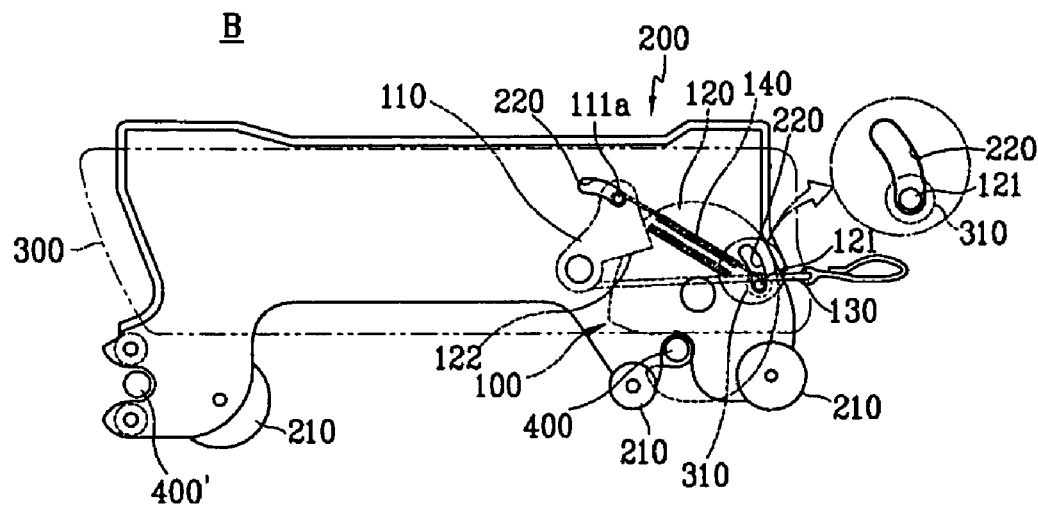
FIG. 4 is a side view of a second embodiment of a detachable seat for a vehicle of the present invention.
Figure 5:
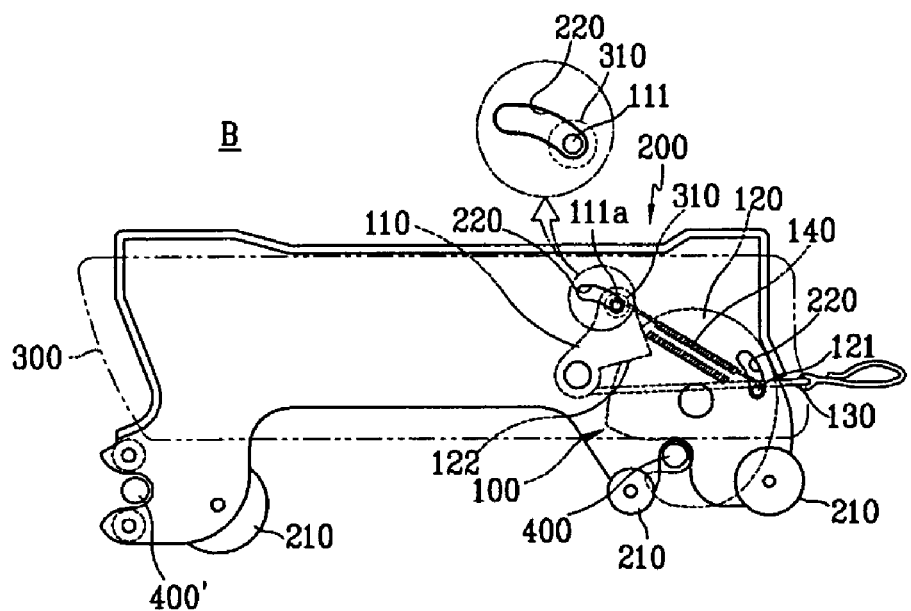
FIG. 5 is a side view of a further embodiment of a detachable seat for a vehicle of the present invention.

As shown in FIG. 4, in an alternative embodiment, the visible paint is applied on the lock cam pin 111 guiding the rotation of the said lock cam 110. The indicator window 310 can be formed in the rotation section of the said lock cam pin 111 and as shown in FIG. 5, in a further alternative embodiment, the visible paint is applied on the lock plate pin 121 guiding the rotation of the said lock plate 120. The indicator window 310 also can be formed in the rotation section of the said lock plate pin 121.

A detachable seat for a vehicle according to embodiments of the present invention configured is thus provided with recesses formed in forward and downward directions on the front and rear of the body section 200 so that the section can be received in the striker 400, 400' provided on the floor panel of the vehicle. Also provided are the multiple rolling mechanisms 210 that can be spun to assist the movement of a seat.

Therefore, the body section 200 of the bracket (B) is inserted into the striker 400, 400' and the locking section 100 of the bracket (B prevents the striker 400, 400' from being released while the seat is locked unto the car body. The seat can also be released from the car body selectively by having the locking section 100 released from the striker 400, 400' by controlling the release lever 130 additionally provided on the said locking section 100.

The locking section 100 that locks or releases the bracket (B) to or from the striker 400, 400' comprises lock cam 110 and lock plate 120 which are fastened, respectively, to the body section 200 at one side, and lock cam pin 111 and lock plate pin 121, protruding outside on the lock cam 110 and lock plate 120 to limit the rotation angle to a specified angle, are inserted into the guide groove 220 formed on the specified section of the said body section 200 to be guided. In addition to this, an elastic mechanism 140 like a coil spring is connected to the lock cam pin 111 and lock plate pin 121 so the lock cam 110 and lock plate 120 can be interlocked with each other. The bracket (B), composed of the locking section 100 and the body section 200 as described above, are equipped with the covers 300 on both sides so that it is not exposed to outside.

As illustrated in FIGS. 1 to 3, the interlocking section 100 that is interlocked as the striker 400 is locked or released preferably has two colors applied thereon that are easily identifiable, such as red and green. The indicator window 310 is formed on the cover 300 by penetration so the painted section of the said locking section 100 can be easily recognized from the side so that the user can easily determine whether the locking section 100 of the bracket (B) is correctly locked to the striker 400 on the floor panel by the color seen through the indicator window 310 formed on the cover 300 by penetration.

In the present invention, the specific interlocking section, which is interlocked as the said striker 400 is locked or released, is provided at the locking section 100 so the components of the lock cam pin 111 of the lock cam 110 or the lock plate pin 121 of the lock plate 120 that are interconnected as the striker 400 is locked or released can be applied as it is, or the components of a separate object that can exhibit the designated color through the indicator window 310 on the cover 300 can be added to the components interlocking as described above.

As shown in FIGS. 1 to 3, in one embodiment of the detachable seat for a vehicle of the present invention, the indicator panel 121a applied separately with red and green paint is added to the lock plate pin 121 of the lock plate 120 provided on the locking section 100 that rotates to the designated angle as the striker 400 is locked or released. An indicator window 310 can be formed by a penetration at a position on the cover 300 that is appropriate for red and green colors to be shown outside as the indicator panel 121a rotates. Therefore, the user can clearly determine visually through the indicator window 310 and the indicator panel 121a from outside whether the locking section 100 of the bracket (B) is correctly locked unto the striker 400 provided on the floor panel.

This operation can be explained referring to FIGS. 1 to 3 as follow:

First, in order to lock the detachable seat of the present invention unto a vehicle, the front recess formed on the body section 200 of the seat bracket (B) is inserted into the front striker 400' as illustrated in FIG. 3, the rear recess on the body section 200 is inserted into the rear striker 400 and then the lock plate 120 is rotated clockwise as the striker 400 comes in contact with the lock plate 120 as illustrated in FIG. 2 and at the same time, the lock plate pin 121 provided on the lock plate 120 is guided into the guide groove 220 to limit the maximum rotation angle of the lock plate 120.

The lock cam 110 is then inserted into the lock plate 120 and the lock cam 110 is inserted and locked into the engagement recess 122 formed in a right angle to restrict the counter-clockwise rotation of the lock plate 120 as it is rotated clockwise by the elastic mechanism 140. Thus, the lock cam 110 restricts the counter-clockwise rotation of the lock plate 120 and the seat bracket (B) is securely locked to the striker 400.

The indicator panel 121a, additionally provided on the lock plate pin 121 of the lock plate 120, also is rotated by interlocking as the lock plate 120 rotates clockwise. Before the indicator panel 121a is rotated, the section painted with green is revealed through the indicator window 310 of the cover 300 as illustrated in FIG. 3. But after the indicator panel 121a is rotated, the section painted with red is revealed through the indicator window 310 as illustrated in FIG. 2. Thus the user can easily determine whether the seat bracket (B) has been correctly locked to the striker 400 on the car body through the change of colors between green and red revealed through the indicator window 310 on the cover 300.

When the seat bracket (B) is detached from the car body, the release lever 130 provided on the locking section 100 must be pulled up. Then the lock cam 110 connected to the release lever 130 is rotated counter-clockwise and the lock cam 110 is released from the engagement recess 122 on the lock plate 120 as illustrated in FIG. 3. The lock plate 120 is transferred to the state that it can rotate counter-clockwise and then the lock plate 120 rotates counter-clockwise through interlocking by the elastic mechanism 140. The indicator panel 121a provided on the lock plate pin 121 of the lock plate 120 is rotated counter-clockwise together and the color revealed through the indicator window 310 on the cover 300 is changed again from red to green.

Therefore, the user can easily determine whether the seat bracket (B) has been detached from the car body by the color of the indicator panel 121a revealed through the indicator window 310 on the cover 300.

And as shown in FIG. 4 for an alternative embodiment of the detachable seat for a vehicle of the present invention, the user can determine whether the seat bracket (B) has been correctly locked to the striker 400 by the color revealed to the outside through the indicator window 310, similar to that described above, by painting the lock plate pin 121 of the lock plate 120 directly with a highly recognizable color. The indicator window 310 is formed on the cover 300 within the section where the lock plate pin 121 is guided without adding a separate indicator panel 121a to the lock plate pin 121 of the lock plate 120.

Similarly, as illustrated in FIG. 5 for another alternative embodiment of the detachable seat for a vehicle of the present invention, the same function can also be performed by painting the lock cam pin 111 of the lock cam 110 with highly recognizable paint and forming the indicator window 310 on the cover 300 within the section where the lock cam pin 111 is guided.

Therefore, because the user can clearly determine whether the seat bracket (B) has been correctly locked to the striker 400, 400' on the floor panel by the change of colors revealed through the indicator window 310 provided on the cover 300, the detachable seat for a vehicle of the present invention not only can improve user convenience, but also can prevent injury to passengers that can happen when the detachable seat is turned over at various car accidents when the detachable seat has not been correctly locked to the car body. It also has the advantage of substantially improving the marketability of the vehicle as well as the safety of passengers.

What is claimed is:

1. A detachable seat mechanism for a vehicle, comprising:
   a bracket including a locking section equipped with a lock cam and a lock plate which can selectively be locked to a striker provided on a floor panel of the vehicle;
   at least one cover provided on a side of the bracket with at least one indicator window formed in the cover;
   a distinct color on the locking section so that it is possible to check through the indicator window from outside whether the seat is locked when the striker is locked at the locking section; and
   an indicator panel painted with said color and fastened to a lock plate pin that guides rotation of the lock plate and the indicator window is formed on a rotation section of the said indicator panel.

2. The detachable seat for a vehicle as in claim 1, further comprising a lock cam pin guiding rotation on the lock cam, said lock cam pin including said distinct color, and the indicator window is formed on a rotation section of the lock cam pin.

3. The detachable seat for a vehicle as in claim 1, further comprising a lock plate pin guiding rotation of the lock plate, said lock plate pin including said distinct color, and the indicator window is formed on a rotation section of the lock plate pin.

* * * * *